(12) United States Patent
Lambert

(10) Patent No.: US 8,041,664 B1
(45) Date of Patent: Oct. 18, 2011

(54) SUPERVISORY CONTROL BY NON-HUMANS

(75) Inventor: David R. Lambert, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 937 days.

(21) Appl. No.: 12/019,970

(22) Filed: Jan. 25, 2008

(51) Int. Cl.
*G06N 5/00* (2006.01)

(52) U.S. Cl. .......................... 706/46; 706/45
(58) Field of Classification Search ............ 706/46, 706/45
See application file for complete search history.

(56) References Cited

U.S. PATENT DOCUMENTS

| | | | |
|---|---|---|---|
| 4,729,342 A | 3/1988 | Loctin | |
| 4,838,207 A | 6/1989 | Bom et al. | |
| 5,025,796 A | 6/1991 | Hargreaves et al. | |
| 5,037,399 A | 8/1991 | Reichert et al. | |
| 5,078,094 A | 1/1992 | Hoover | |
| 5,095,852 A | 3/1992 | Hoover | |
| 5,345,943 A | 9/1994 | Hargreaves et al. | |
| 5,351,649 A | 10/1994 | Rovira Badia et al. | |
| 5,398,694 A | 3/1995 | Poppendiek et al. | |
| 5,425,330 A | 6/1995 | Touchton et al. | |
| 5,435,271 A | 7/1995 | Touchton et al. | |
| 5,799,609 A | 9/1998 | Burns et al. | |
| 5,842,437 A | 12/1998 | Burns | |
| 6,055,934 A | 5/2000 | Burns et al. | |
| 6,431,941 B1 | 8/2002 | Frawley et al. | |
| 6,630,455 B1 | 10/2003 | Mitchell | |
| 6,858,020 B2 | 2/2005 | Rusnak | |
| 2004/0006309 A1 | 1/2004 | Rusnak | |
| 2004/0071799 A1 | 4/2004 | Xu et al. | |
| 2005/0040956 A1 | 2/2005 | Allen et al. | |
| 2005/0043681 A1 | 2/2005 | Rusnak | |
| 2005/0043707 A1 | 2/2005 | Rusnak | |
| 2005/0060102 A1 | 3/2005 | O'Reilly et al. | |
| 2005/0260084 A1 | 11/2005 | Rusnak | |
| 2006/0064203 A1 | 3/2006 | Goto et al. | |
| 2006/0186393 A1 | 8/2006 | Santelli | |
| 2006/0240554 A1 | 10/2006 | Chen et al. | |

OTHER PUBLICATIONS

Kim, Strategies for Control of Neuroprostheses through Brain-Machine Interfaces, Doctoral Thesis, MIT, Aug. 22, 2005, pp. 1-156.*
Temple Grandin and Catherine Johnson, Animals in Translation, Book, 2005, pp. 242-251, Scribner, New York, NY.
Temple Grandin, Thinking The Way Animals Do, Nov. 1997, pp. 140-145, Western Horseman.
Temple Grandin and Mark J. Deesing, Behavioral Genetics and Animal Science, 1998, pp. 1-26, Chapter One, Acedemic Press, San Diego, California.

* cited by examiner

*Primary Examiner* — Wilbert L Starks
(74) *Attorney, Agent, or Firm* — Kyle Eppele; J. Eric Anderson

(57) ABSTRACT

Execution of functions by a non-human being is achieved by providing the non-human being with an I/O interface for receiving information, and permitting the non-human being to execute functions consistent with the abilities of the non-human being. An input/output interface is used to provide the non-human being with sensory information and to accept control information from the non-human being. An input/output processing system converts signals communicated through the input/output interface. An operation control interface is used for controlling the functions executed by the non-human being.

20 Claims, 2 Drawing Sheets

SUPERVISORY CONTROL BY NON-HUMANS

FEDERALLY-SPONSORED RESEARCH AND DEVELOPMENT

This subject matter (Navy Case No. 097150) was developed with funds from the United States Department of the Navy. Licensing inquiries may be directed to Office of Research and Technical Applications, Space and Naval Warfare Systems Center, San Diego, Code 2112, San Diego, Calif., 92152; telephone 619-553-2778; email: T2@spawar.navy.mil.

BACKGROUND

1. Field of the Invention

This subject matter relates to computer control and to the use of a system in which the supervisory expertise is a non-human being, such as a salient being or a biological non-human. More specifically the subject matter relates to any system or combination of systems that use one or more non-human beings to interact with another system providing sensor or action functions in order to permit the non-human being to perform a task.

2. Background of the Invention

In many instances, direct operation is impractical, for example, because of hazard or because of impossibility. In a typical instance, a remote function is performed by a human, using external sensing and control. An example of this is the operation of a remote manipulator, in which a camera and mechanical actuators are used to perform a function, such as pipe inspection or extraction of atomic fuel rods. In this case the supervisory control is executed by the operator in a fairly straightforward fashion.

Other examples of remote sensing include automatic train control (ATC), by which a railroad vehicle responds to signals and predetermined control inputs, such as acceleration, to operate the train. The operator is able to override the controls or to override the controls within limits established by the ATC, but in some circumstances may allow the ATC to control the train without operator intervention.

Supervisory control can be used to describe a direct hands-on function, such as the manipulation of the controls of a vehicle or the use of a computer operator interface. An example is the above-mentioned ATC. The supervisor need not be the supervisor in a military or business sense, and in some cases the supervisory control may be overridden by a controlled individual.

An example of supervisory control by a subordinate is found in the use of tracking dogs. The handler of a tracking dog allows being led, as the handler, by the tracking dog. In this way, the tracking dog executes supervisory control of the team in the sense of execution of the tracking function. If the handler deems a particular area or direction should or should not be investigated, the handler will provide overriding control; yet permit the tracking dog to continue to provide primary supervision of the tracking duty.

SUMMARY

Execution of functions is performed by a non-human being by providing the non-human being with an I/O interface for receiving information and permitting the non-human being to execute functions consistent with the abilities of the non-human being. An input/output interface provides the non-human being with a type or modality of information comprising at least one of sensory information, assessment information and decision support, the interface accepting at least one of control, advisory information or other information from the non-human being. Information is processed by converting signals communicated through the input/output interface, and an operation control interface is provided for controlling the functions as commanded by the non-human being.

DETAILED DESCRIPTION

Overview

Figure 1:
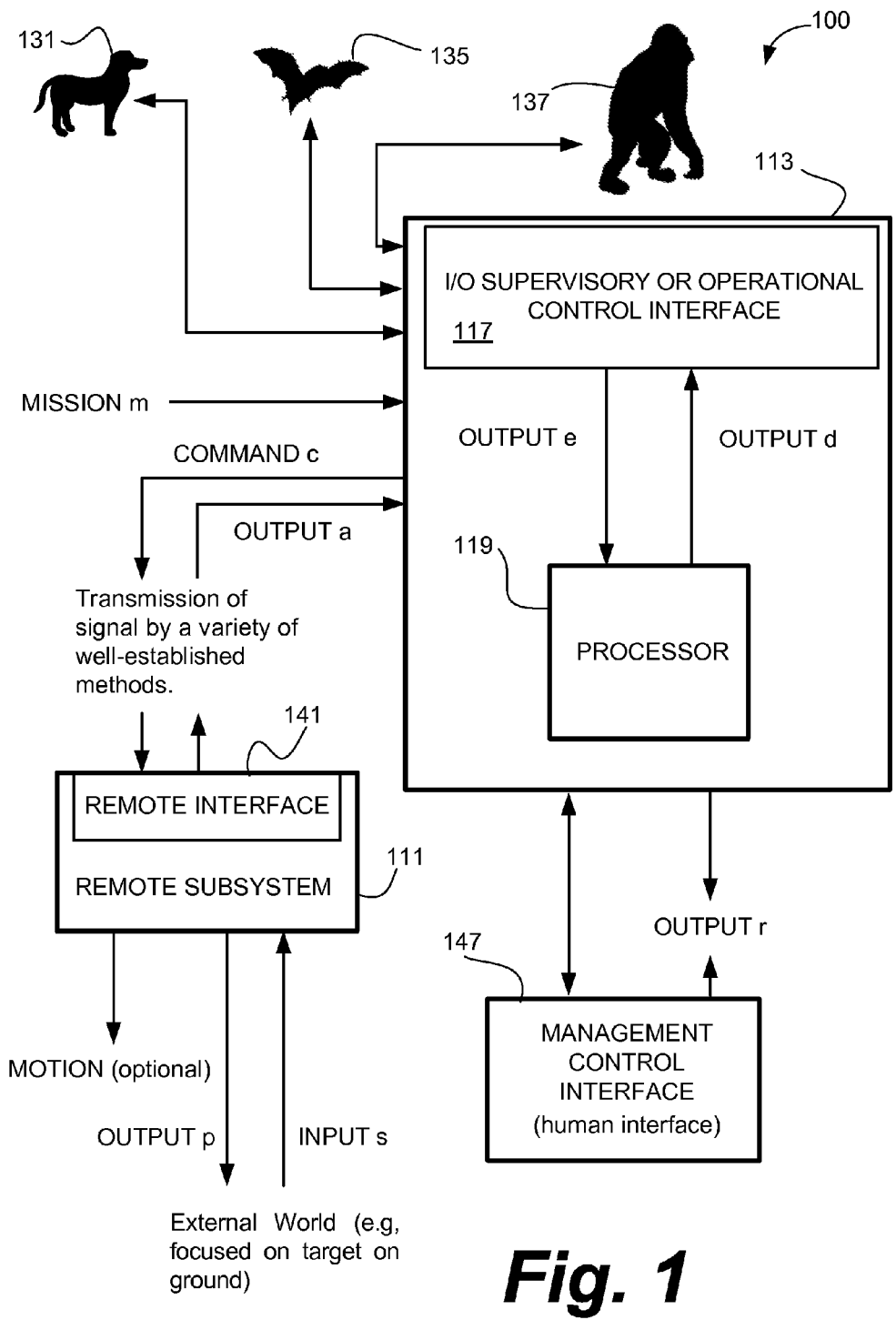
FIG. 1 is a diagram depicting a system configuration.

The present system addresses a need of the operation and tactical community to gather accurate data.

Species-Appropriate User Interface

The particular user interface should be sufficiently adapted to the species having supervisory control to at least provide a function meaningful to the species. Supervisory systems and subsystems are well documented. The described system concerns a system or subsystem in which the supervisory expertise is one or more non-human beings, such as a salient being or a biological non-human being. More specifically the subject matter relates to any system or combination of systems that use one or more non-human beings to interact with another, usually a remote, "sensor/action" system to perform a task. The task may be one that, if performed directly, would normally endanger the performer, and will normally involve sensing, actions, transmissions, and local information processing on the part of the "sensor/action" subsystem, and sensing, cognitive situation assessment, and/or decision-making on the part of the non-human supervisory system. Alternatively, the task may be one that is otherwise best performed by the use of the intelligence of a non-human being, such as a non-human salient being. Typically, there is some advantage for the non-human to be at a location away from the source of the input signals and/or the destination of the output signals, either or both of which is/are typically in a remote location.

Types of sensory information used range from simple to highly complex, and may represent anything from a single component (e.g., a single frequency in a spectrum) to a full description (e.g., complete frequency spectrum over time) with multiple sensor types (e.g., audio, visual, chemical (odors), etc.).

In the case of external inputs, it may be necessary to implement computer user inputs and outputs according to the behaviour and sensory capabilities of the entity functioning in lieu of a human interface. For example, an on-line map for dogs would be pretty useless without indicia of smells, and without the indicia of smells being appropriate for the dog. Similarly, a qwerty keyboard is not a concept that dogs would grasp, and so one would find it inconvenient to try to teach a dog to use a qwerty keyboard.

On the other hand, a dog is far more capable to react to and reason the identity and location of a tracked being based on scent. This is partially attributable to the acute sense of smell of dogs, which is a combination of the dependence of dogs on the sense of smell, the instinct or behavioural "wiring" of dogs, and the intellectual interest that dogs have in tracking scents. If a human were to be able to detect the scent, the human would still be significantly less capable than the dog in using the scent for tracking and identification purposes.

The aptitude often extends beyond capabilities with the particular sense. Going back to the example of scent, it is possible for a human to use the sense of smell to detect the state of tune of an internal combustion engine or to detect other faults. This is something that would be meaningless to a dog, despite the dog's more acute sense of smell. There simply is no natural interest or comprehension by the dog regarding these concepts (although training might create interest). Therefore the ability to use a sense is in part associated with the ability of the particular salient entity to interpret the information, as well as the ability of the salient entity to receive the sensed information.

Much of the ability to interpret information is believed to relate to, in the case of mammals, the manner in which the being processes information through the cerebral cortex, and the transfer of information between the cerebral cortex and parts of the brain closer to the brain stem. This is described in detail by Grandin and Johnson, Animals in Translation, ISBN 978-0156031448 Harvest Books (2006), and in Grandin, and Deesing, *Behavioral Genetics and Animal Science*, ISBN 0-12295130-1 (Academic Press 1998; http://www.grandin.com/references/genetics.html)

By configuring the user interface of a computer or control system in a manner adapted to the non-human salient being, the intellectual, instinctual or reasoning capability of the non-salient being can be utilized in a manner which both enhances the ability of the non-human being to provide results and which takes advantage of the different abilities of the non-human being. This technique can be used for observation or sensing, as well as executive functions. The parameters of the non-human being's functions can be controlled as desired in the sense that the overall scheme or the tactical approach to the function or task is able to be controlled to the extent that the non-human being is willing to perform the tasks.

Similarly, other beings would be likely to interface with equipment differently from humans. The system would use an input/output interface providing the non-human being with any type or modality of sensory and/or other assessment and decision support information and accepting control and/or advisory or other information from the non-human being.

This technique is suitable for use with any salient being that can perform executive functions. This can include higher mammals, such as porpoises, simian beings, and dogs. The technique can also be used with more reactive species, such as rats, with less salient beings such as insects and fish, with microscopic life forms such as bacteria, mold, and viruses, and with parts of life forms such as mitochondria, DNA-related-actors, or other cell components. Similarly, the technique can use an input/output interface accepts control or advisory information from an abnormal component of a being such as a cancer cell.

The sensory information, assessment information and decision support can include data implemented with multiple sensor types, corresponding to multiple senses of the non-human. It is further possible to use multiple species of non-humans and a combination of humans and non-humans to accomplish the desired tasks.

Configuration

FIG. 1 depicts a system configuration 100, including a remote subsystem 111, an Input/Output (I/O) subsystem 113 providing an input/output interface 117 for the non-human being and a processor subsystem 119. The remote subsystem 111 provides remote sensing and processing to the extent desired to provide external sensing for providing indicia to the non-human being or to external operation for execution by the non-human being.

The supervisory non-human being can be any of a variety of beings, represented in the figure as a dog 131, a bat 135, and a primate 137. It is noted that the represented non-human beings are for example purposes only, and this subject matter is not limited to those beings recited herein. It is not required that the system 100 be configured for use by only one type of non-human being.

The I/O subsystem 113 is the actual operating interface for the non-human being and is used by the non-human being to interact with the system. The I/O subsystem 113 is closely tied to the processor subsystem 119, in the manner that computer I/O equipment such as displays and keyboards are closely tied to the processor subsystem 119.

Referring to FIG. 1, the remote subsystem 111 includes a remote interface 141. The remote interface 141 interfaces with the processor subsystem 119 to communicate data between the remote subsystem 111 and the processor subsystem 119. The remote subsystem 111 provides sensing and/or output functions, and may optionally provide motion control. Examples of the remote subsystem 111 would include chemical sensors, cranes, drone aircraft, ground vehicles and submarine craft. The remote interface 141 may also include weapons capabilities. The remote subsystem 111 can use established on-board autonomous and sensory capabilities. This enables the interaction with the external world, through an output p and an input s. The use of a remote subsystem 111 allows the non-human being to use its unique capabilities from the relatively secure and authoritative supervisory position. The non-human being need not change location and it can multi-task using inputs from multiple remote subsystems 111. As a result, the non-human being is not subservient to human action in the non-human being's operation of the system.

The I/O interface 117 is the transducer allowing operation by the non-human being and provides a supervisory or operational interface with the non-human being. The transducer may be a directly controlled device, or may be indirect, as in a scent generator, a video screen or an image tracking system. The I/O interface 117 provides a transducer function and uses mission m and the remote subsystem's outputs. Mission m is the particular mission or overall command for execution by the system. The I/O interface 117 communicates with the processor subsystem 119.

The processor subsystem 119 provides the computing and database capabilities of the system 100. The processor subsystem 119 communicates with the I/O interface 113 by receiving data and control signals from the I/O interface 113, represented as output e and providing data and control signals to the I/O interface 113, represented as output d. This is similar to current computer systems configured with multiple I/O.

The remote subsystem 111 communicates with the I/O interface 117 or directly with the processor subsystem 119 in order communicate data and control signals. The remote subsystem communicates with the I/O subsystem 113, including the processor subsystem 119, by providing an output a of data and control signals to the I/O subsystem 113 and receiving data and control signals as commands c from the I/O subsystem 113, including the processor 119. The transmission of the data and control signals a, c may be achieved by variety of well-established methods.

Despite the non-human being not being subservient to human action in the non-human being's operation of the system, the overall control of the system is presumed to be human. Thus if, for example, the non-human being decides to launch a weapon, the human can override the decision. This is achieved through a management control interface 147.

The operation of the system is performed by the non-human being through the I/O interface 117. The non-human being may be a robot or a biological non-human being. The non-human being may be any of a variety of life forms, for example, dolphin, primate, bat, and pigeon. Alternatively, the system may be human or have a human component, or another system or combination of systems. The system may operate actively or passively. Conceptually, it is possible to provide the system as a swimming vehicle carrying a simulated dolphin sonar device that pings into Environment B, listens for echoes. Alternatively, System B can forego the ping and simply listen. System B may do some preprocessing of data, and then (possibly covertly) transmit the echoes back to virtual Environment A for presentation to the supervisor dolphin.

All transmissions may be clear, covert, disguised, encrypted, etc. The transmission may be minimal (e.g., for economy or security) or maximal (e.g., for fidelity or reliability). There may be loss of fidelity and/or reconstruction/enhancement of signal during the transmission/reception processes.

Upon receipt of the signal, Environment A presents it to the supervisor (dolphin), who then listens and performs a task as trained. During the task, which involves its non-human cognitive processes, the supervisor makes an assessment and/or decision, and provides an indication of the next step the robot should do. The next step may be, for example, an action that activates a specific signaling, recording, or transmitting device. This information (e.g., a steering command; a ping specification, etc.) is then transmitted to the robot for implementation in Environment B.

The system may be configured as a closed loop system and may provide feedback in either direction on the results of previous commands, actions, etc. The system may also be implemented as a training system so the supervisor and/or the robot may be trained either prior to actual operation, or on the job. It is noted that the non-human being (System A) must be able to perform the task it is given, but that it need not necessarily be the same task it would do directly if it were at location B. System A may be a hybrid human/non-human/machine system and may exert control over Subsystem B. For example, B may require a secret key from the human part of System A before it can transmit actively or release a weapon.

Note that Environments A and B may be anything, of any scale (tiny to huge), and include ground, subterranean, ocean surface, subsurface, air, space, etc. Environment A may be stationary or mobile, for example e.g., on a ground vehicle, surface or subsurface vessel, aircraft, space station, etc. Environment A may be anything from a simple supervisory capability to a complex virtual environment. Environment B may be near or far from Environment A, and may be extremely hot, cold, light, dark; electronically, electromagnetically, chemically or radiologically polluted, hazardous, uninhabitable; etc.

A potential supporting technology is, among others, the Navy Marine Mammal Program's "biometric" sonar of dolphins Another application area is the use of dogs as guard-duty supervisors, for example to increase the size of the area or number of guard stations they can visually or auditorily monitor.

The creation of a virtual environment that makes good use of particular senses may be problematic. An example is the remote transmission of detected scents when using the sense of smell of a dog or other animal. It should be noted in this regard that the systems described above can, in principal, be built even if development may be required to implement any given design.

As with human interfaces, the correspondence between the actual sensed input or output and the interface need not match. In the case of a human interface, radar images may or may not appear in the same configuration as the received echo. Similarly, supplemental information or controls may be implemented. In the case of radar, supplemental information and control includes transponder queries and secondary return information. In the case of the I/O interface 117, the information at the I/O interface 117 need not directly correspond to the information at the remote subsystem 111.

The lack of correspondence has an advantage, in that some sensed information is difficult to replicate in the virtual environment. The sense of smell is notable in that respect. It is possible to use sensitive chemical detectors to detect particular odors, but the ability to replicate these odors in the virtual environment is limited.

It may also be necessary to train the being to respond to the particular scent. By way of example, a dog could be trained to detect and track a particular scent. When a completely different type of scent is to be detected, the training may not be effective for that different type of scent. It is also the case that similar scents or distracting scents can interfere with detection. In the case of remote sensing, the particular olfactory sensing ability of the dog is less important, but the behavioral instincts of the dog and the dog's intelligence with respect to tracking are valuable.

The I/O subsystem 113 can be used to standardize the olfactory inputs to the dog, while separately sensing what may be a completely different item. The remotely sensed item may be outside the scope of the dog's training and may be outside the scope of the dog's olfactory abilities, but the I/O subsystem 113 can operate with a more easily managed scent substance. Thus, a dog trained for locating a particular food can be used to track something the dog is unable to detect or which would be dangerous to the dog, such as a radioactive isotope.

The effectiveness of the sensing or other function is enhanced according to a mapping of what the non-human being can sense or perform, and the remote subsystem 111. This is most easily accomplished by matching direction and distance to virtual direction and either distance or an analog of distance, such as intensity or resonance.

The remote system also provides physical abilities that could exceed the mobility of the non-human being. This permits the non-human being to access dangerous areas or areas which are inaccessible to the non-human being.

The remote operation also provides an ability to allow the being to multitask in different environments, as would be the case of basic detection at multiple points. This also allows an operation to be performed by multiple beings, for example, in order to relieve the being from fatigue.

Example

Remote Sensing

A dog is able to patrol a perimeter by listening for unusual noises, such as unknown humans traversing the patrolled area. In order to enhance the effectiveness of this, the dog is placed in a virtual environment and taught to comprehend the virtual environment. Remote inputs sense noises and other environmental factors, and these are mapped to the virtual environment. Multiple regions, normally beyond the geographical area sensed by a single dog, can be provided to a single dog's virtual environment. Multiple dogs can be provided with similar inputs, so as to provide a redundancy in the sensing by the dogs. The redundancy can be used for aggregated sensing or can be used to filter nuisance alerts.

It may turn out that other species are more effective than dogs in sensing unusual activity, but would not be useful in a real world environment. This would likely be the case of prey species, who are often alert for unusual activity, but would be less likely than a dog to be vocal about an intrusion. By establishing a virtual environment, it is possible to monitor such species in a controlled environment.

Example

Remote Activity

Figure 2:
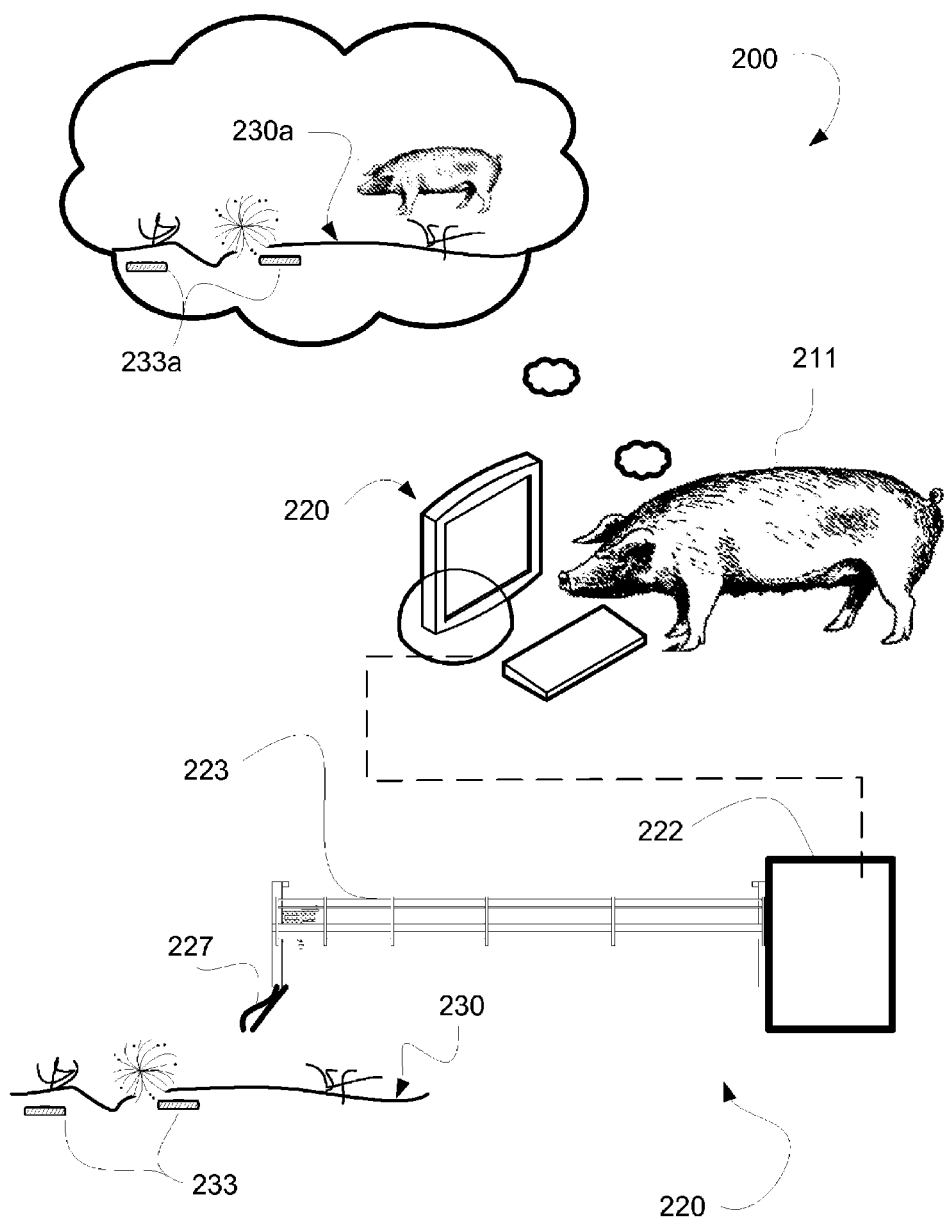
FIG. 2 is a representation of an example remote system, in which a pig is placed in a virtual environment presented by a computer interface.

FIG. 2 is a representation of an example remote system 200, in which a pig 211 is placed in a virtual environment presented by computer interface 220. The computer interface 220 is operatively connected to a remote module 222. A particular task requires an airborne remote subsystem 220 which is controlled by the remote module 222, and may be either operated as a crane 223 or a free-flying aircraft such as a hovercraft, but uses the sensing and rooting skills of a pig. The crane or free-flying aircraft 223 is provided with a probe 227. The probe extends over terrain 230 and is able to sense environmental factors at the terrain 230 and may probe the terrain 230, with the expectation of discovering objects 233. By using the airborne unit 220 as a remote sensor, the airborne unit 220 can provide sensing or function, but has physical abilities that exceed that of the non-human being.

A virtual world is provided such that the pig 211 can react to a representation of the terrain 230a, and receive inputs. If the inputs are mapped to indicia of the objects 233 such as chemical traces or if the probe 227 provides indicia corresponding to alterations in the terrain 230, the pig 211 can sense inputs mapped to what is indicated by the probe 227, and discover or probe in locations 233a which can be mapped to the objects 233. The indicia provided to the pig 211 can correspond to the indicia from objects 233 sensed by the probe 227, or can be mapped analogs more appropriate to the nature of the pig 211, such as vegetables (or truffles according to classical tracking functions). If the mapping of the activity of the airborne unit can be associated with the response of the non-human being in the virtual world, the non-human being can be used to perform tasks consistent with the tools afforded by the remote subsystem 220. In the case of a minefield, the pig could fly in a virtual sense over the minefield (terrain 230), and virtually sense and root for mines (objects 233). The probe 227 can then be used to remove the mines 223 with or without the control assistance of the pig 211. Since this is accomplished in a virtual sense, the pig would continue unharmed.

Example

Ocean Search and Rescue

The visual acuity of a pigeon is better than human's, and it is expected that the neurological "wiring" of a pigeon is focused on taking advantage of this visual acuity. Transmission is made via telemetry of high-resolution video of search area from the remote UAV search vehicle to pigeons in home-based high-resolution circular theater environment, preferably in four primary colors corresponding to the pigeons' vision. The pigeons' task is to indicate the direction of any objects of a particular configuration, for example any objects of a particular color or shape. This approach would use techniques similar to techniques as pigeon-based search aboard helicopters, including restricting each pigeon's search area, and use of a reward-based pecking task.

Example

Detection of Intruders in Forest

It is accepted that a dog's hearing is superior to that of a human. This not only applies to hearing sensitivity, but also to the ability to interpret sounds and audio pattern recognition. Establish a sensor field of microphones in the forest and transmit their outputs to a similar array (not necessarily similarly located) in a home-based space with suitable acoustics and provisions for dogs. Train dogs on what "normal" is, and then on what various kinds of intruders in the forest environment sound like in the home-based environment. When the dogs detect an intruder of interest in the home-based environment, they trigger an appropriate action in the real forest and/or alert their local handler so that humans can take appropriate action in the real forest. It is also possible to insert simulated targets in the virtual environment for continued training purposes, and to keep up the dogs' interest in the task.

Example

Detect and Stop Invaders at a Border

In order to take advantage of a dog's auditory pattern recognition, a sensor field of microphones is used. The sensor field of microphones is established at the border and transmit their outputs to a similar array in a home-based space as above. Dogs are trained on what "normal" is, and then on what sound patterns various kinds of border-crossers produce in the home-based environment. When the trained dogs detect an intruder of interest in the home-based environment, they trigger an appropriate action at the real border and/or alert their local handler so that humans can take appropriate action at the border.

Example

Detect Odor-Producing Contraband in a Subway Station

A dog's "nose", or odor pattern recognition, is better than human's. In this example, the chemicals given off by the contraband can be broken up into an array of individual chemicals, some of which may be individually detected by arrays of various kinds of individual chemical sensors in the subway station, rather like a Fourier analysis of acoustical noise or the electromagnetic spectrum. Sensors detect a variety of "individual" chemicals that together make up at least parts of the more complex patterns produced by the contraband. The outputs of the sensors are transmitted to a corresponding array of effectors that reproduce a corresponding, though probably not nearly identical, complex chemical field in a home-based space with suitable air currents and provisions for dogs. The effectors may or may not be located in a similar pattern to that of the sensors. The dogs are trained on what effects "normal" smells in the subway environment have on the chemical environment in the home-based space. Additionally, the dogs are trained on how various kinds of contraband (drugs, "fear", etc.) in the subway environment change the chemical smell patterns in the artificial home-based environment. When the trained dogs detect an odor of interest in the home-based environment, they trigger an appropriate action in the real subway (e.g., activate high-speed, high-resolution cameras) and/or alert their local handler so that humans can take appropriate action.

Example

Predict and Prevent Mold Growth on a Windshield

Mold's "sensitivity to good growing conditions" (recognition of combinations of heat, light, moisture, nutrients that promote growth of particular types of mold) is better than human's. Establish a sensor field of detectors of heat, light, humidity, and perhaps certain nutrients such as fertilizer chemicals (potassium, nitrogen, phosphorous, etc) at a remote windshield location and transmit their outputs to a similar array of transducers to produce similar components in a home-based "Petri dish" container with everything else required for good mold growth. Adjust signal amplitudes in the home-based environment to suppress mold growth there under "normal" conditions. Then calibrate by adjusting for high mold growth in the home-based environment when conditions at the remote windshield begin to approach the threshold for unacceptable mold growth there. Then, in operation, mold growth in the home-based environment will occur before mold growth on the windshield and can be used to signal initiation and control of mold-suppression actions (e.g., change the "climate", or activate a wiper or a sanitizing spray) at the windshield.

The Virtual Environment

While the concepts of non-human beings performing tasks in the manner described is interesting, the interface for the non-human being is made effective by providing an effective mapping between the real world events at the remote subsystem 111, and the virtual environment provided at the I/O subsystem 113. This can be provided as an approximation of a matching correspondence. Alternatively, the scale or type of the sensing or activity of the remote subsystem 111 can substantially differ from that of the virtual environment.

As a close approximation in the virtual world of the real environment, a full scale controlled environment could be provided. This would require monitoring the non-human being's activities as the non-human being traversed the controlled environment, but reduces the amount of training that would be necessary if the non-human being were to sit behind a computer and respond in a stationary position. The reconstruction of a local environment to be provided to the non-human being (1) may be used to provide safety for the non-human being, (2) may be used to provide a variation in the mapping of activity in the virtual environment to the environment of the remote subsystem 111, and (3) may allow convenient access to the real environment without the need to transport the non-human being to the real environment.

On the other hand, there could be cases where sufficient activity of the non-human being can take place within a limited space. This would require that the non-human being react well within the limited space and that the reaction be properly sensed by the I/O subsystem 113.

CONCLUSION

It will be understood that many additional changes in the details, materials, steps and arrangement of parts, which have been herein described and illustrated to explain the nature of the subject matter, may be made by those skilled in the art within the principal and scope of the invention as expressed in the appended claims.

What is claimed is:

1. A method for execution of functions by a non-human being, said functions consistent with the abilities of the non-human being, the method comprising:
   providing a sensor in a remote environment that is remote from the non-human being in a local environment;
   generating a signal with the sensor that represents a characteristic of the remote environment;
   transmitting the signal to the local environment;
   transforming the signal into a secondary signal with a computer, wherein the nature of the secondary signal is such that the natural abilities of the non-human being are better suited to detecting and/or processing the secondary signal than the natural abilities of a human being;
   exposing the non-human being to the secondary signal; and
   monitoring a reaction of the non-human being to the secondary signal.

2. The method of claim 1, further comprising the step of manipulating, by the non-human being, in response to the secondary signal, a remote apparatus in the remote environment.

3. The method of claim 2, wherein the non-human being is a dolphin, the sensor is an underwater microphone, the remote environment is an underwater environment of interest, and the remote apparatus is an underwater vehicle, and wherein the step of manipulating the remote apparatus further comprises the step of maneuvering the remote apparatus through the remote underwater environment of interest by the dolphin through manipulation of a dolphin-appropriate computer interface in the local environment.

4. The method of claim 2, wherein the non-human being is a dog, the sensor is a chemical detector configured to detect concentration levels of a chemical, the secondary signal is an scent, the strength of the scent being a function of the concentration level of the chemical detected by the chemical detector, and the remote apparatus is a vehicle configured to move under the supervisory control of the dog.

5. The method of claim 2, wherein the non-human being is a pig, the sensor is a probe comprising a chemical detector, the remote environment is a mine field, the secondary signal comprises a vegetable scent, and the remote apparatus is a is a mine removal apparatus, and wherein the step of manipulating the remote apparatus further comprises the step of maneuvering the mine removal apparatus through the mine field by the pig through manipulation of a pig-anatomy-appropriate computer interface in the local environment.

6. The method of claim 2, wherein the non-human being is a pig, the sensor is a probe comprising a metal detector, the remote environment is a mine field, and the secondary signal comprises a vegetable scent.

7. The method of claim 6, wherein the step of manipulating the remote apparatus further comprises the step of maneuvering a mine removal apparatus through the mine field by the pig through manipulation of a pig-appropriate computer interface in the local environment.

8. The method of claim 1, wherein the non-human being is a dolphin, the sensor is an underwater microphone, and the remote environment is an underwater environment of interest.

9. The method of claim 1, wherein the non-human being is a dog, the sensor is a chemical detector configured to detect concentration levels of a chemical, and the secondary signal is an scent, the strength of the scent being a function of the concentration level of the chemical detected by the chemical detector.

10. The method of claim 9, further comprising the step of triggering, by the dog, an alarm if the dog detects the scent.

11. The method of claim 1, wherein the non-human being is a dog, the sensor is a radioactive isotope detector, and the secondary signal is an scent, the strength of the scent being a function of the concentration level of the radiation detected by the radioactive isotope detector.

12. The method of claim 11, further comprising the step of triggering, by the dog, an alarm if the dog detects the scent.

13. The method of claim 1, wherein the non-human being is a dog, the sensor is a series of microphones and video cameras, the remote environment comprises multiple regions that would normally be beyond the geographical region that could be sensed by a single dog if the single dog were present in the remote environment, and the secondary signal comprises visual and audio signals.

14. The method of claim 13, further comprising the step of triggering, by the dog, an alarm if the dog detects an intruder in the remote environment.

15. The method of claim 1, wherein the non-human being is a prey species, the sensor is a series of microphones and video cameras and the secondary signal comprises visual and audio signals.

16. The method of claim 15, further comprising the step of triggering, by the prey species, an alarm if the prey species detects an intruder in the remote environment.

17. The method of claim 1, wherein the non-human being is a pig, the sensor is a probe comprising a chemical detector, the remote environment is a mine field, and the secondary signal comprises a vegetable scent.

18. The method of claim 1, wherein the non-human being is mold, the sensor comprises heat detectors, light detectors, and humidity detectors, and wherein the remote environment is a windshield, and the secondary signal comprises heat, light, and humidity, and the method of claim 1 further comprises the step of adjusting the amplitude of the secondary signal such that mold begins to grow in the local environment prior to growing in the remote environment.

19. The method of claim 1, wherein the non-human being is a cancer cell.

20. The method of claim 1, wherein the remote environment is dangerous to the non-human being.

* * * * *